United States Patent [19]

Mühlebach et al.

[11] Patent Number: 5,210,169
[45] Date of Patent: May 11, 1993

[54] THERMOSETTING COMPOSITION

[75] Inventors: Andreas Mühlebach, Belfaux; Erich Gruber, Marly, both of Switzerland

[73] Assignee: Ciba-Geigy Corporation, Ardsley, N.Y.

[21] Appl. No.: 838,128

[22] Filed: Feb. 19, 1992

[30] Foreign Application Priority Data

Feb. 21, 1991 [CH] Switzerland ............... 526/91

[51] Int. Cl.$^5$ ............................................. C08G 18/80
[52] U.S. Cl. ........................................ 528/45; 528/68
[58] Field of Search ........................................... 528/45

[56] References Cited

U.S. PATENT DOCUMENTS 4,242,248 12/1980 Gras et al. ............... 528/45
4,797,494 1/1989 Ivanov et al. ............ 528/45
4,976,837 12/1990 Hughes et al. .......... 528/45

OTHER PUBLICATIONS

Beilstein, vol. 23, Main Volume p. 39, Supplementary vol. EI, p. 15, EIII/IV p. 23.
H. J. Backer & W. Meyer, Rec.d. Traveaux Chim. des Pays-Bas 45, (1926) p. 428.
T. Sakai, K. Miyata, S. Tsubor & M. Utaka, Bull. Chem. Soc. Jpn. 62 (1989) p. 4072.
Beilstein, vol. 23 Main Vol. p. 122 IE, P. 232, EIII, p. 117 and EIII/IV p. 1055.
Mitsuhaski et al. J. Heterocyclic Chem. 19, (1982), p. 1389.

Primary Examiner—Maurice J. Welsh
Attorney, Agent, or Firm—William A. Teoli, Jr.

[57] ABSTRACT

The invention relates to a thermosetting composition which comprises at least one blocked polyisocyanate of formula I or II

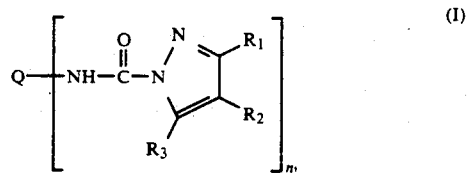

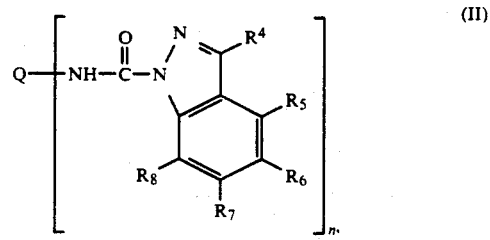

wherein
n is an integer $\geq 2$,
Q is an organic radical of valency n, and
$R_1$, $R_2$, $R_3$, $R_4$, $R_5$, $R_6$, $R_7$, $R_8$ are each independently of one another hydrogen, alkyl, aryl, arylalkyl, alkoxy, alkylthio or hydroxyl, and
a primary or secondary polyamine which is liquid at room temperature and is suitable for crosslinking, which blocked polyisocyanate is essentially insoluble in the polyamine at ambient temperature or moderately elevated temperature.

The novel compositions invention have a particularly high reactivity and good shelf stability. An important embodiment of the invention relates to those compositions in which the blocked isocyanate is essentially insoluble in the polyamine at the storage temperature. The novel compositions are especially suitable for bonding plastics materials and metals.

8 Claims, 1 Drawing Sheet

FIG. 1

THERMOSETTING COMPOSITION

The present invention relates to a thermosetting composition which comprises at least one polyisocyanate, the isocyanate groups of which are blocked with pyrazole or indazole derivatives, and a polyamine hardener which is liquid at room temperature. The invention further relates to the use of such polyamines as thermal hardeners for pyrazole- and indazole-blocked polyisocyanates, and to the use of said compositions for bonding.

It is known in the art to block polyisocyanates with a variety of blocking agents, as with phenols and also pyrazoles. The reaction of the polyisocyanates with the blocking agent makes it possible for the isocyanate groups to react with compounds which contain active (mobile) hydrogen atoms (hardeners or curing agents) only at elevated temperature, with which compounds the pure isocyanates react at very low temperature to undergo crosslinking. It is therefore possible to mix blocked isocyanates at room temperature with the curing agents and to handle and store the mixtures for a certain length of time. To effect a full cure, the mixtures are heated to a temperature at which also the blocked polyisocyanates react with the hardeners. Many types of compounds have already been disclosed as suitable hardeners, including polyalcohols, polyamines, polythiols, polycarboxylic acids, tri- or diamides, urethanes or water.

The use of polyisocyanates to block pyrazole derivatives is disclosed in U.S. Pat. No. 4,976,837. The claimed advantage of the blocked polyisocyanates so obtained is that they are stable to active hydrogen containing compounds used as hardeners at ambient temperatures but form reactive polyisocyanates at quite low temperatures. The use of such compositions as components of electrophoretically deposited paints is also disclosed in this patent specification. Polyamide-polyamine resins, such as reaction products of dimer fatty acids and aliphatic polyamines, are disclosed as suitable hardeners.

The use of compositions comprising polyalcohols and specific polyisocyanates blocked with 3-methylpyrazole for bonding is disclosed in U.S. Pat. No. 4,797,494. These compositions cure at temperatures in the range of 120° C. and thus make it possible to obtain adhesive bonds at these rather low temperatures. It is also claimed that the compositions are stable at room temperature for some time. The shortcoming of these polyol-containing compositions is that the gel time, especially in the temperature range from 100°-120° C., is very long.

It is the object of this invention to provide a thermosetting composition which is based on blocked polyisocyanates and has an enhanced stability/reactivity ratio, i.e. which has both long-term shelf stability at ambient temperature as well as low gel times and curing times at temperatures below 160° C., especially in the temperature range from 100°-120° C.

Specifically, the invention relates to a thermosetting composition which comprises at least one blocked polyisocyanate of formula I or II wherein
n is an integer $\geq 2$,
Q is an organic radical of valency n, and
$R_1$, $R_2$, $R_3$, $R_4$, $R_5$, $R_6$, $R_7$, $R_8$ are each independently of one another hydrogen, alkyl, aryl, arylalkyl, alkoxy, alkylthio or hydroxyl, and
a primary or secondary polyamine which is liquid at room temperature and is suitable for crosslinking, which blocked polyisocyanate is essentially insoluble in the polyamine at ambient temperature or moderately elevated temperature.

The expression "ambient temperature" will be understood in the present context as meaning a temperature in the range from about 10° C. to about 30° C.

The blocked polyisocyanates must contain at least two pyrazole- or indazole-blocked isocyanate groups per molecule, but they may also contain three or even more such isocyanate groups. Accordingly, the group Q in formulae I and II is an at least divalent organic radical. Although the upper value of n may in principle be of any magnitude, n is preferably in the range from 2 to 5. The group Q may typically be an aliphatic, cycloaliphatic or a mixed aliphatic-aromatic radical.

The compounds of formulae I and II are normally solid at least ambient temperature. Some may also be highly viscous or pasty, especially if they still contain a fairly high proportion of impurities. Preferred compounds of formulae I and II are those which are solid at at least ambient temperature, especially those having melting points above about 80° C.

Blocked polyisocyanates in the compositions of this invention are all polyisocyanates which are crosslinkable, including hexamethylene diisocyanate (HDI), trimethylhexamethylene diisocyanate (TMDI), cyclohexane diisocyanate (CHDI), isophorone diisocyanate (3,5,5-trimethyl-1-isocyanato-3-isocyanatomethylcyclohexane; IPDI), methylenedicyclohexyl isocyanate (HMDI), p-phenylene diisocyanat (PPDI), diisocyanatotoluene (TDI), for example 2,4-diisocyanatotoluene, 2,6-diisocyanatotoluene and technical mixtures of both isomers, naphthylene diisocyanate (NDI), especially 1,5-naphthylene diisocyanate, dianisidine diisocyanate (DADI), methylenediphenyl diisocyanate (MDI), especially the 4,4'-isomer, and also technical mixtures of different isomers, such as the 4,4'- and 2,4'-isomers, or polymethylenepolyphenyl isocyanate (PAPI). Very suitable polyisocyanates are also those which are obtainable by reaction of polyisocyanates with themselves via isocyanate groups, including uret diones or carbodiimides formed by the reaction of two isocyanate groups, or isocyanurate or biuret compounds which are formed by reaction of three isocyanate groups. Also suitable for use in the invention are polyisocyanate prepolymers which contain on average more than one isocyanate group per molecule and are obtained by prereacting a molar excess of one of the polyisocyanates referred to above with an organic material which contains at least two active hydrogen atoms per molecule, for example in the form of hydroxyl groups, as in polyalkylene glycols. Such isocyanates are commonly available and commercially obtainable in profusion.

Preferred polyisocyanates are methylenediphenyl diisocyanate (MDI), and especially isophorone diisocyanate (IPDI) and, most particularly, hexamethylene diisocyanate (HDI), the isocyanurate of hexamethylene diisocyanate and the biuret of hexamethylene diisocyanate.

The free isocyanate groups of the basic polyisocyanates can be reacted either with pyrazole derivatives or with indazole derivatives. In the former case, blocked polyisocyanates of formula I are obtained and, in the latter case, blocked polyisocyanates of formula II.

Preferably, however, the compositions of this invention will contain pyrazole-blocked polyisocyanates of formula I, as pyrazoles are more easily obtainable and it is usually possible to cure these compositions at lower temperature, i.e. the compositions begin to gel at lower temperature.

The pyrazolyl protective group as well as the indazolyl protective group may be unsubstituted. $R_1$ to $R_8$ in formulae I and II would in this case all be hydrogen.

Both protective groups, however, may also carry substituents: the pyrazolyl group usually up to 3 and the indazolyl group up to 5 substituents. For practical reasons, however, each group will preferably carry one or two or not more than three substituents.

The preferred meanings of the substituents $R_1$, $R_2$, $R_3$, $R_4$, $R_5$, $R_6$, $R_7$, $R_8$ are:

Alkyl, alkoxy or alkylthio of 1 to 5 carbon atoms, of which in turn methyl and methoxy are preferred.

Aryl containing up to 10 ring carbon atoms, preferably phenyl, which aryl radicals may in turn carry substituents, typically alkyl or alkoxy groups.

Arylalkyl, preferably aryl($C_1$-$C_4$)alkyl, more particularly arylmethyl, in which the aryl moiety is suitably phenyl, 4-methoxyphenyl, 4-toluyl, as well as heteroaromatic groups such as 2-furyl or 4-pyryl. Most preferably, arylalkyl is benzyl.

One or more of the substituents $R_1$ to $R_8$ may be hydroxyl groups. This may be advantageous because hydroxyl groups react readily with silane couplers, so that it is thereby possible to obtain especially good bonding of the cured compositions also to particularly problematical substrates.

If individual or all the substituents $R_1$ to $R_8$ are substituents which act as electron donors, then in particular the reactivity of the blocked polyisocyanates towards the polyamines is enhanced. This is most especially the case when a plurality of such substituents is present. Such an enhanced reactivity of the blocked polyisocyanates may be of advantage because it can contribute to lower gelation and curing temperatures and to a shorter gel time of the novel compositions. Suitable radicals for enhancing the reactivity include alkyl, such as methyl. Thus, the reactivity of a polyisocyanate blocked with an unsubstituted pyrazole is lower than that of one blocked with 3-methylpyrazole, and its reactivity is in turn lower than that of an isocyanate blocked with 3,5-dimethylpyrazole. As, moreover, 3,5-dimethylpyrazole is very readily available, compositions comprising polyisocyanates blocked with 3,5-dimethylpyrazoles constitute a particularly useful embodiment of the invention.

The preparation of pyrazole and indazole derivatives for blocking polyisocyanates is known to those skilled in the art. Many are also commercially available.

Pyrazole derivatives may be obtained by reacting suitably chosen i,i+2-diketones, typically a 1,3-diketone, with hydrazine, with or without a solvent (e.g. toluene) in accordance with the following reaction scheme:

The preparation of many pyrazole derivatives is described in Beilstein, Volume 23, Main Volume p. 39, Supplementary Volume EI, p. 15, EIII/IV, p. 23. The preparation of pyrazole derivatives containing alkoxy substituents can also be specially carried out according to H. J. Backer and W. Meijer, Rec. d. Traveaux Chim. des Pays-Bas 45 (1926), p. 428, by alkylation of pyrazolones. The introduction of arylalkyl substituents at the pyrazole ring is in many cases possible by means of a particularly suitable one-pot reaction for the direct arylmethylation of i,i+2-diketones (e.g. acetylacetone) according to T. Sakai, K. Miyata, S. Tsuboi and M. Utaka, Bull. Chem. Soc. Jpn. 62 (1989), p. 4072, and subsequent reaction with hydrazine.

To prepare indazole derivatives, attention is likewise drawn to Beilstein, Vol. 23, Main Volume, p. 122, EI, p.Z32, EII, p. 117 and EIII/IV, p. 1055.

The further preparation of the pyrazole- and indazole-blocked polyisocyanates can then be carried out by quantitative reaction of the pyrazoles and indazoles with the polyisocyanates under inert gas. It is preferred to carry out the process at elevated temperature and in a suitable inert solvent (e.g. toluene), in the absence or presence of a catalyst (e.g. dibutyltin laurate). The exothermic reaction of both compounds may necessitate cooling. Further modes of carrying out such reactions are also disclosed in U.S. Pat. No. 4,797,494 or U.S. Pat. No. 4,976,837.

Polyisocyanates blocked with 5-hydroxypyrazoles may also conveniently be obtained by reacting the free isocyanates with 5-pyrazolones, as these always contain in equilibrium some 5-hydroxypyrazole (Mitsuhaski, Takanagi, Matsuno, Tanaka, J. Heterocyclic Chem. 19 (1982), p. 1389).

The second obligatory component of the novel composition is a primary or secondary polyamine hardener which is liquid at ambient temperature and is suitable for crosslinking. This polyamine hardener leads to deblocking of the polyisocyanate by heating the composition to crosslink the polyisocyanate. The expression "suitable for crosslinking" means in this context that the polyamine must be at least bifunctional if a polyisocyanate having a functionality greater than 2, for example 2.1, is used in the composition, but more than bifunctional if only a bifunctional polyisocyanate is used.

Typical examples of suitable polyamines are aliphatic polyamines, such as diethylenetriamine or triethylenetetramine, cycloaliphatic diamines, such as cyclohexanediamines, aromatic diamines, typically methylene dianiline.

Polyoxyalkylenepolyamines, including polyoxyethylene-amines and, more particularly, polyoxypropylenepolyamines, are particularly useful polyamines for polyisocyanates containing more than two isocyanate groups per molecule, for example those of the following bifunctional type:

$$H_2N+CH_2CH(CH_3)O\overline{]_m}CH_2CH(CH_3)NH_2.$$

In this formula m may have the value 2 or 3. The polyoxyalkylene chain in the cited polyamines can, however, also be branched and contain more than two amino groups in the molecule. Very suitable polyamines for polyisocyanates containing on average two isocyanate groups per molecule are polyoxypropylene-polyamines of the following (trifunctional) type:

$$CH_2[CH_2]_x[OCH_2CH(CH_3)]_yNH_2$$
$$CH[CH_2]_x[OCH_2CH(CH_3)]_yNH_2$$
$$CH_2[CH_2]_x[OCH_2CH(CH_3)]_yNH_2.$$

In this formula x may be 0 or also 1, and the y values may be 2 or 3, and may also differ from chain to chain. The molecular weights of the polyoxyalkylene-polyamines are preferably below 500.

The polyoxyalkylene-amines described in the foregoing paragraph are also commercially available under the registered trademark Jeffamine ®. Compositions containing polyoxyalkylene-amines constitute a particularly useful embodiment of the invention.

The novel compositions conveniently contain blocked polyisocyanates and polyamines in a ratio which ensures that amino hydrogen atoms can be supplied in an amount which is stoichiometrically equivalent to the 0.5-fold to twice the amount of isocyanate groups which the composition is able to make available. The composition preferably has an equimolar ratio of blocked isocyanate groups to amino groups. The stoichiometric ratio of the cited groups in the composition governs, inter alia, the degree of polymerisation during the cure and the type of the resultant end groups. By varying this ratio it is possible to control the reactivity of the composition and its mechanical properties after the cure.

In addition to the cited components, the novel compositions can contain customary additional components in the conventionally used amounts, typically viscosity regulators, extenders, fillers, reinforcing agents, metal particles, pigments, dyes, plasticisers, adhesion promoters, fungicides, antioxidants, levelling agents, diluents, including reactive diluents such as epoxy resins, and others.

The novel compositions can be used for all purposes where thermosetting compositions based on blocked polyisocyanates are normally used, typically as paint or paint base, as sealing compound or adhesive. The cure can be effected by applying heat in any form. It can also be effected using microwaves or by induction heating, in which latter case the compositions must of course contain electrically conductive particles, such as metal particles.

The compositions of this invention are very reactive. The gel and curing times of the compositions are usually less than 20 minutes even in the temperature range of 100°–120° C., but are often a few seconds to 5 minutes. At these temperatures, corresponding compositions containing polyols as hardeners usually require gel times of one hour or longer.

In addition, the novel compositions have an excellent stability/reactivity ratio, although these two properties are normally in opposition to each other. To achieve a long shelf life, it is useful to add to the blocked isocyanate a preferably weakly reactive curing agent or hardener. Weakly reactive curing agents, which include the polyols, result in lengthy gel times, as previously stated. The novel compositions, however, can be readily stored at ambient temperature or at moderately elevated temperature for several months without any perceptible increase in their viscosity. Along with a reactivity many times greater, they have a stability which at least matches, and in many cases is superior to, that of conventional compositions based on blocked isocyanates.

As the novel compositions are intended for storage and for handling during their pot life (prior to the cure) at temperatures at which the blocked isocyanate is essentially not yet soluble in the polyamine, the temperature below which dissolution still does not occur should preferably be as high as possible. Although compositions also have a stability which will often suffice where this temperature is in the range from 20° to 40° C., those compositions are especially preferred in which the blocked isocyanate in the polyamine is essentially insoluble in the temperature range up to 50° C., still better up to 80° C., and which therefore also withstand correspondingly higher storage and shelf temperatures. These compositions include compositions which contain the pyrazole-blocked polyisocyanates based on polymethylene diisocyanates, especially 1,6-hexamethylene diisocyanates, and polyoxypropylenepolyamines.

Solubilities like those described above may be determined by simple observation. Thus, for example, pyrazole-blocked 1,6-hexamethylene diisocyanate forms with polyoxypropylene polyamines at ambient temperature or slightly elevated temperature a turbid suspension, whereas upon heating to 100°–105° C. a clear, transparent solution of both components forms before the composition subsequently gels.

Figure 1:
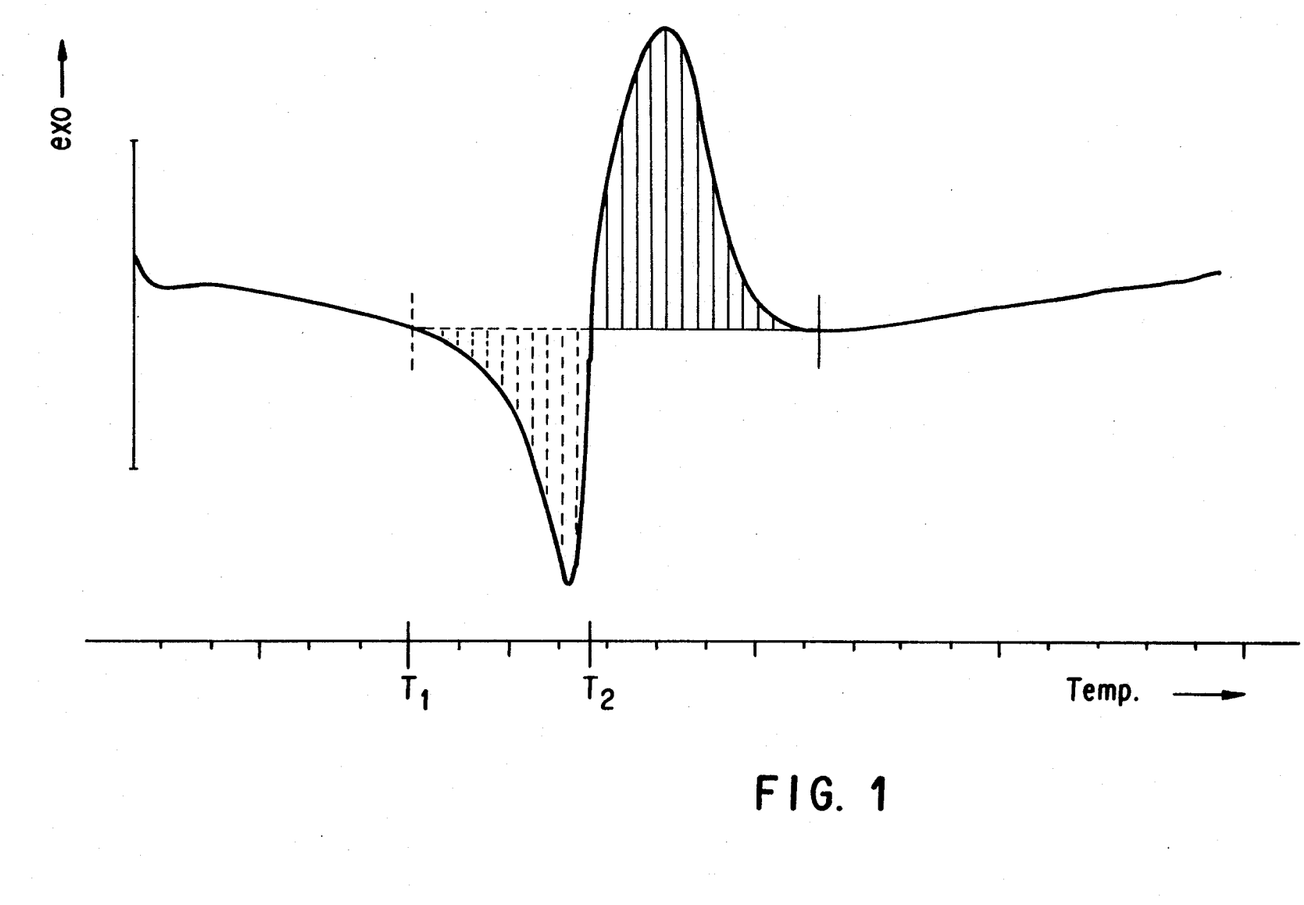

Particularly preferred novel compositions are those in which the blocked polyisocyanate dissolves in the polyamine endothermically. This can be determined in simple manner, for example by differential thermoanalysis. The diagram obtained upon heating such a sample starting from room temperature shows initially an endothermic peak resulting from the endothermic dissolution of the blocked polyisocyanate in the polyamine, followed by a further peak resulting from the exothermic curing reaction of the blocked polyisocyanate with the polyamine. FIG. 1 shows the appearance of such a diagram which can be obtained using a differential scanning calorimeter. At the temperature $T_1$ the blocked polyisocyanate begins to dissolve, at the temperature $T_2$ the dissolution is complete and the cure begins. Below the temperature $T_1$ the blocked polyisocyanate in the polyamine is essentially insoluble.

It is also possible to add to the compositions an additional agent which lowers the solubility of the blocked isocyanate. In this manner a further enhancement of the stability/reactivity ratio of the novel compositions can be achieved. Even in cases in which the blocked polyisocyanate would normally be soluble in the polyamine it is possible to achieve an essential insolubility of the polyisocyanate in the polyamine which will suffice for the purposes of the invention and hence a sufficient stability prior to the cure. Novel compositions which contain such an agent therefore also fall within the scope of the present invention.

Suitable agents for lowering the solubility of pyrazole- or indazole-blocked polyisocyanates in polymines are typically substances which increase the polarity (hydrophilic properties) of the medium which surrounds the blocked isocyanates in the uncured composition. The solubility of the relatively hydrophobic blocked polyisocyanates is poorer in a more strongly polar medium, so that these compositions have a longer pot life.

To increase the polarity there may be used compounds which carry one or more hydroxyl groups. Many polyamines, including polyoxyalkylenepolyamines, can be mixed with such compounds within wide limits. Exemplary of suitable hydroxyl group containing compounds are glycols such as glycerol. Water too can in principle be used. This is one of the reasons why the novel compositions can also be stored for extended periods of time in open containers, for their shelf life is further prolonged by moisture absorption. This applies in particular to polyoxyalkylenepolyamine containing compositions.

The compositions may contain the hydroxy compounds in an amount of up to 50% by weight, based on the polyamine. As amines react very much more rapidly with isocyanates than hydroxy compounds, large amounts of these hydroxy compounds usually do not interfere with the curing reaction. The addition of these hydroxy compounds may additionally have a plasticising effect.

Hydroxy compounds which are still not excessively volatile at the temperatures applied for the cure have the advantage that, in the course of the cure, they are unlikely to lead to the formation of gas bubbles which might interfere with the homogeneity of the composition. For this reason among others it is especially preferred to use glycerol as agent for lowering the solubility of the blocked isocyanates in the novel compositions. It will preferably be added in an amount of 10 to 20% by weight, based on the polyamine. A further advantage can be that glycerol has a plasticising effect on the cured composition.

Although the novel compositions are particularly suitable for use as single component compositions in view of their long-term shelf life, it is also possible initially to store both essential components of the compositions separately and then to mix them just shortly before the (first) use, i.e. to obtain a two-component composition. Such a two-component composition has a long and virtually unlimited pot life.

The invention also relates to the use of primary or secondary polyamines which are liquid at ambient temperature and are suitable for crosslinking as thermal hardeners for blocked polyisocyanates of formula I or II wherein
n is an integer $\geq 2$,
Q is an organic radical of valency n, and
$R_1$, $R_2$, $R_3$, $R_4$, $R_5$, $R_6$, $R_7$, $R_8$ are each independently of one another hydrogen, alkyl, aryl, arylalkyl, alkoxy, alkylthio or hydroxyl,
with the proviso that the blocked polyisocyanates essentially do not dissolve in the polyamines at at least ambient temperature.

The invention further relates to the use of at least one blocked polyisocyanate of formula I or II above, together with at least one primary or secondary polyamine which is liquid at ambient temperature and is able to crosslink polyisocyanates, and in which polyamine the blocked polyisocyanate is essentially insoluble at at least ambient temperature, as adhesive system. Such adhesive systems have particularly good bond strength and shear strength.

In view of their good shelf life, the novel compositions can be used in particular as thermosetting single component adhesives.

Those novel compositions which contain blocked polyisocyanates in which Q in formula I or II is selected from the organic radicals II to VII have especially good bond strength:

(VII)

where the $R_9$ substituents in formula III are each independently of one another hydrogen or alkyl of 1 to 4 carbon atoms, preferably hydrogen or methyl. These compositions have in particular outstanding shear strength properties.

Adhesive compositions of this invention make it possible to bond a wide variety of substrates, including wood, metals, glass and all kinds of plastics materials. As the polyamines used are liquid, the novel compositions can also usually be applied simply and readily. The joints have excellent bond strength and mechanical strength. The invention thus further relates to a method of bonding load-bearing parts, which comprises the use of a thermosetting composition as described hereinabove.

The novel compositions are able to bond well poorly bondable plastics such as polyvinyl chlorides, polycarbonates (PC), acrylonitrile/butadiene/styrene copolymers (ABS), polyamides (PA), prepregs or sheet moulding compounds (SMC) with one another or also with metals, so that the use of said novel compositions for bonding plastics materials is especially preferred. A very suitable storage-stable thermosetting adhesive for plastics materials is typically a composition consisting of 3,5-dimethylpyrazole-blocked 1,6-hexamethylene diisocyanate, polyoxypropylenetriamine (especially Jeffamine ® T 403) together with an optional adhesion promoter and fillers.

Another particular advantage of the adhesive systems based on pyrazole-blocked polyisocyanates is that the pyrazole derivatives split off during the cure act as ("in situ") primers, especially on untreated surfaces, more particularly on metal surfaces such as oily steel. Cleansing or de-oiling the surfaces to be bonded is therefore in these cases entirely unnecessary, as the bond strength of the adhesive compositions on, for example, steel which has not been de-oiled, is about twice as high as that of other polyisocyanate adhesives when using the novel compositions.

EXAMPLE 1

Synthesis of pyrazole-blocked hexamethylene diisocyanate 300 ml of toluene are charged to a 750 ml sulfonating flask equipped with thermometer, reflux condenser, mechanical stirrer and inert gas inlet. Then 56.7 g (0.833 mol) of pyrazole and 0.057 g of dibutyltin dilaurate (DBTL catalyst) are added and the suspension is stirred for 5 minutes at 25° C. Then 70 g (0.4165 mol) of hexamethylene diisocyanate, dissolved in 200 ml of toluene, are slowly added dropwise under nitrogen. A white suspension forms during the ensuing exothermic reaction. This suspension is heated for 4 hours under reflux (c. 110° C.) to give a homogenous solution in which free isocyanate is no longer detectable. The solution is cooled to 10° C., whereupon the pyrazole-blocked hexymethylene diisocyanate crystallises and is isolated by filtration and dried overnight at 50° C. under a high vaccum to give 124.30 g (98.1% yield) of product.

Melting point: 135° C. (DSC)

Elemental analysis: calcd: C: 68.26% H 9.00% N 22.74%; found: C: 68.48% H 8.86% N 22.32%.

IR (KBr): $\nu(C=O)$ 1710 cm$^{-1}$.

EXAMPLE 2

Synthesis of pyrazole-blocked methylenediphenyl diisocyanate

The reaction is carried out as described in Example 1, using 73.5 g (0.294 mol) of methylenediphenyl diisocyanate (Isonate ® M 125 [DOW]), 40 g (0.588 mol) of pyrazole, 0.040 g of dibutyltin dilaurate and a total amount of 400 ml of toluene. Yield after drying: 110 g (97%) of product.

Melting point: 201.5° C. (DSC)

Elemental analysis: calcd: C: 65.27% H 4.70% N 21.75%; found: C: 65.48% H 4.66% N 21.55%.

IR (KBr): $\nu(C=O)$ 1712 cm$^{-1}$.

EXAMPLE 3

Synthesis of pyrazole-blocked isophorone diisocyanate 150 ml of toluene are charged to a 350 ml sulfonating flask equipped with thermometer, reflux condenser, mechanical stirrer and inert gas inlet. Then 20.0 g (0.294 mol) of pyrazole and 0.200 g of dibutyltin dilaurate (DBTL catalyst) are added and the suspension is stirred for 5 minutes at 25° C. Then 32.7 g (0.147 mol) of isophorone diisocyanate, dissolved in 50 ml of toluene, are slowly added dropwise under nitrogen, while keeping the temperature below 30° C. The reaction mixture is heated for 2 hours under reflux (c. 110° C.), after which no more free isocyanate is detectable. The reaction mixture is cooled and the solvent is removed on a rotary evaporator. The residue is dried overnight at 40° C. under a high vacuum, giving 53.7 g (c. 100% yield) of product in the form of a yellow oil.

Elemental analysis: calcd: C: 59.98% H 7.83% N 23.32%; found: C: 62.73% H 7.50% N 21.21%.

IR (KBr): $\nu(C=O)$ 1732 cm$^{-1}$.

EXAMPLE 4

Synthesis of pyrazole-blocked tris(1-isocyanatohexyl) isocyanurate

The reaction is carried out as described in Example 3, using 50.0 g (0.273 mol of NCO) of industrial tris(1-isocyanatohexyl) isocyanurate (Tolonate ® HDT [Rhône Poulenc Chimie]), 18.6 g (0.273 mol) of pyrazole, 0.050 g of dibutyltin dilaurate and a total amount of 150 ml of toluene. After drying (24 h, 60° C., high vacuum) there are obtained 68.6 g (c. 100% yield) of product in the form of an orange oil.

Elemental analysis: calcd: C: 55.92% H 6.83% N 23.71%; found: C: 58.57% H 7.14% N 21.33%.

The deviations are attributable to the technical quality of the isocyanurate used.

IR (KBr): $\nu(C=O)$ 1725 cm$^{-1}$, $\nu(C=O,$ isocyanurate) 1684 cm$^{-1}$.

EXAMPLE 5

Synthesis of pyrazole-blocked tris(1-isocyanatohexyl) biuret

The reaction is carried out as described in Example 3, using 50.0 g (0.25 mol of NCO) of industrial tris(1-isocyanatohexyl) biuret (Tolonate ® HDB [Rhône Poulenc Chimie]), 17.02 g (0.25 mol) of pyrazole, 0.050 g of dibutyltin dilaurate and a total amount of 150 ml of toluene. After drying there are obtained 63.2 g (94% yield) of product.

Elemental analysis: calcd: C: 56.89% H 7.38% N 24.62%; found: C: 59.89% H 7.66% N 21.05%.

The deviations are attributable to the technical quality of the tris(1-isocyanuratohexyl) biuret used.

IR (KBr): ν(C=O) 1722 cm$^{-1}$, ν(C=O, biuret) 1690 cm$^{-1}$.

EXAMPLE 6

The reaction is carried out as described in Example 1.

| Amount: | 20.7 g | of hexamethylene diisocyanate |
| --- | --- | --- |
| | 20.0 g | of 3-methylpyrazole |
| | 0.02 g | of DBTL |

Yield: c. 100%
m.p. 86° C.
Elemental analysis: calcd: C: 57.81% H 7.28% N 25.28%; found: C: 57.82% H 7.28% N 25.13%.
IR (KBr): ν(C=O) 1718 cm$^{-1}$.

EXAMPLE 7

The reaction is carried out as described in Example 1.

| Amount: | 28.9 g | of methylenediphenyl diisocyanate |
| --- | --- | --- |
| | 20.0 g | of 3-methylpyrazole |
| | 0.02 g | of DBTL |

Yield: 86%
m.p. 171° C.
Elemental analysis: calcd: C: 66.65% H 5.35% N 20.28%; found: C: 66.71% H 5.38% N 20.17%.
IR (KBr): ν(C=O) 1728 cm$^{-1}$.

EXAMPLE 8

The reaction is carried out as described in Example 3.

| Amount: | 27.6 g | of isophorone diisocyanate |
| --- | --- | --- |
| | 20.0 g | of 3-methylpyrazole |
| | 0.02 g | of DBTL |

Yield: c. 100%
Elemental analysis: calcd: C: 62.15% H 7.82% N 21.74%; found: C: 65.62% H 7.99% N 18.71%.
IR (KBr): ν(C=O) 1728 cm$^{-1}$.

EXAMPLE 9

The reaction is carried out as described in Example 1.

| Amount: | 17.5 g | of hexamethylene diisocyanate |
| --- | --- | --- |
| | 20.0 g | of 3-methylpyrazole |
| | 0.02 g | of DBTL |

Yield: 97%
m.p. 95° C.
Elemental analysis: calcd: C: 59.98% H 7.83% N 23.32%; found: C: 59.98% H 7.93% N 23.30%.
IR (KBr): ν(C=O) 1718 cm$^{-1}$.

EXAMPLE 10

The reaction is carried out as described in Example 1.

| Amount | 26.0 g | of methylenediphenyl diisocyanate |
| --- | --- | --- |
| | 20.0 g | of 3-methylpyrazole |
| | 0.02 g | of DBTL |

Yield: 90%
m.p. 185° C.
Elemental analysis: calcd: C: 67.86% H 5.92% N 18.99%; found: C: 68.06% H 5.95% N 18.86%.
IR (KBr): ν(C=O) 1722 cm$^{-1}$.

EXAMPLE 11

The reaction is carried out as described in Example 3.

| Amount: | 23.1 g | of isophorone diisocyanate |
| --- | --- | --- |
| | 20.0 g | of 3-methylpyrazole |
| | 0.02 g | of DBTL |

Yield: c. 100%
Elemental analysis: calcd: C: 63.46% H 8.71% N 20.17%; found: C: 66.30% H 8.53% N 19.35%.
IR (KBr): ν(C=O) 1724 cm$^{-1}$.

EXAMPLE 12

4.0 g (13.4 mmol) of the product of Example 1 are mixed with 4.1 g of a polyoxypropylenepolyamine containing an average of 3 amino groups in the molecule (Jeffamine ® T 403) and the mixture is passed twice on a three-roll mill. The white mixture so obtained exhibits no noticeable increase in viscosity even after storage for 6 months at 40° C. (both in open and closed containers). The gel times are 42 min at 100° C., 7 min 30 s at 120° C., 2 min 50 s at 140° C. and 40 s at 160° C. The initially white suspension forms a homogeneous solution at temperatures above 100° C. Differential thermal analysis shows that the composition endotherms below 100° C. (maximum at 80° C.) and exotherms above 100° C. (maximum at 121° C.). After a 3 minute cure at 120° C. the shear strength (measured according to ISO 4587) is 4 MPa (Al/Al).

EXAMPLE 13

4.0 g (10.3 mmol) of the product of Example 2 are mixed with 3.2 g of polyoxypropylenepolyamine (Jeffamine ® T 403) and the mixture is milled twice on a three-roll mill. The white mixture so obtained exhibits no noticeable increase in viscosity even after storage for 3 months at 25° C. (both in open and closed containers). The gel times are 6 min 20 s at 100° C., 3 min 50 s at 120° C., 2 min at 140° C. and 1 min at 160° C. Differential thermal analysis shows only one exothermic peak (at 102° C.). The shear strength (measured according to ISO 4587) is 12 MPa (Al/Al).

EXAMPLES 14–21

Mixtures are prepared of a blocked polyisocyanate and a bi- and trifunctional polyoxypropylenepolyamine as indicated in Table 1 and milled twice on a three-roll mill. Jeffamine ® D 230 is a polyoxypropylenediamine having a molecular weight of c. 230, Jeffamine ® T 403 is a polyoxypropylene-amine containing on average 3 amino groups per molecule and having a molecular weight of c. 430. The stability and shear strength (after a 30 min cure at 120° C.) and the gel times indicated in Table 1 are measured.

TABLE 1

| Example | Isocyanate of Example (5 g) | Polyamine | Amount | Stability | Shear strength[3] (Al/Al) | Gelation time[4] at 100° C. | 120° C. | 140° C. | 160° C. |
|---|---|---|---|---|---|---|---|---|---|
| 14 | 3  | Jeffamine ® T 403 | 4.3 g  | ≧3 mo[1]; A.T.[2] | 6.5 MPa  | 18′    | 4′     | 1.5′   | 15″ |
| 15 | 4  | Jeffamine ® D 230 | 2.6 g  | ≧6 mo; A.T.       | 8.0 MPa  | 30′    | 7′30″  | 2′     | 20″ |
| 16 | 5  | Jeffamine ® D 230 | 2.7 g  | ≧6 mo; A.T.       | 11.0 MPa | 15′    | 5′20″  | 2′     | 15″ |
| 17 | 6  | Jeffamine ® T 403 | 4.6 g  | ≧3 mo; 40° C.     | 6.0 MPa  | 18′    | 5′40″  | 1′42″  | 23″ |
| 18 | 7  | Jeffamine ® T 403 | 3.7 g  | ≧3 mo; A.T.       | 15.0 MPa | 3′     | 2′     | 1′43″  | 54″ |
| 19 | 9  | Jeffamine ® T 403 | 4.28 g | ≧6 mo; 40° C.     | 4.0 MPa  | 3′     | 1′46″  | 23″    | 6″ |
| 20 | 10 | Jeffamine ® T 403 | 3.5 g  | ≧1 mo; A.T.       | 16.5 MPa | 33″    | 12″    | 6″     | 3″ |
| 21 | 11 | Jeffamine ® T 403 | 3.7 g  | ≧3 mo; A.T.       | 10.0 MPa | 3′42″  | 1′28″  | 33″    | 5″ |

[1]months
[2]ambient temperature
[3]ISO 4587
[4]′ = min. ″ = s

Compositions of the foregoing Examples in which a polyol is used as hardener instead of a polyamine exhibit substantially longer gel times and, under the same conditions, have only a very much lower shear strength.

EXAMPLE 22

Methylenediphenyl diisocyanate blocked with 4-benzyl-3-dimethylpyrazole is mixed with an equimolar amount of Jeffamine ® T 403 and the mixture is milled twice on a three-roll mill. The resultant mixture exhibits virtually no increase in viscosity even after storage for more than two and a half months. The gel times are 17 min 27 s at 100° C., 41 s at 120° C., 1 min 16 s at 140° C. and 37 s at 160° C. After a 1 hour cure at 120° C. the shear strength (measured according to ISO 4587) is 10.7 MPa (Al/Al). Mixtures based on the components used above are especially suitable for bonding metals.

EXAMPLE 23

Methylenediphenyl diisocyanate blocked with 3,5-dimethylpyrazole is mixed with an equimolar amount of Jeffamine ® T 403 and about 15% by weight of glycerol, based on the entire composition, and the mixture is milled twice on a three-roll mill. The resultant mixture exhibits virtually no increase in viscosity even after storage for more than two months. The gel times are 3 min 39 s at 100° C., 1 min 14 s at 120° C., 37 s at 140° C. and 12 s at 160° C. After a 1 minute cure at 120° C. the shear strength (measured according to ISO 4587) is 8 MPa (Al/Al).

EXAMPLE 24

A thermosetting composition was prepared from the following ingredients and milled twice on a three-roll mill:

| | |
|---|---|
| blocked polyisocyanate of Example 9 | 23.8% by weight |
| Jeffamine ® T 403 | 20.4% by weight |
| Actrel ® 400 (plasticiser based on diarylalkanes) | 6.7% by weight |
| Schellflex ® (diluent based on mineral oil) | 6.7% by weight |
| wollastonite | 39.6% by weight |
| graphite | 1% by weight |
| Aerosil ® 380 | 1.4% by weight |
| Silan-A-1100 ® | 0.5% by weight |

The following Table shows the shear strength values (according to ISO 4587) which are measured after a 1 hour cure at 100° C. and 120° C. using different materials.

| Material | Shear strength in MPa, cure at 100° C. | 120° C. |
|---|---|---|
| ABS | 7.55 | 8.1 |
| PVC | 3.30 | 5.2 |
| PA | 1.76 | 2.6 |
| SMC | 6.16 | 7.55 |
| oily steel | 3.06 | 3.05 |
| Al | 2.9 | 3.3 |
| Al, sand blasted | 7.13 | — |

EXAMPLE 25

A thermosetting composition was prepared from the following ingredients and milled twice on a three-roll mill:

| | |
|---|---|
| blocked polyisocyanate of Example 10 | 24.7% by weight |
| Jeffamine ® T 403 | 17.3% by weight |
| Actrel ® 400 (plasticiser based on diarylalkanes) | 6.9% by weight |
| Schellflex ® (diluent based on mineral oil) | 6.9% by weight |
| wollastonite | 41.2% by weight |
| graphite | 1% by weight |
| Aerosil ® 380 | 1.5% by weight |
| Silan-A-1100 ® | 0.5% by weight |

The following Table shows the shear strength values (according to ISO 4587) which are measured after a 1 hour cure at 100° C. and 120° C. using different materials.

| Material | Shear strength in MPa, cure at 100° C. | 120° C. |
|---|---|---|
| ABS | 6.05 | 5.9 |
| PVC | 1.46 | 1.73 |
| PA | 1.70 | 1.46 |
| SMC | 11.73 | 10.6 |
| oily steel | 14.40 | 14.96 |
| Al | 12.6 | 14.6 |
| Al, sand blasted | 15.76 | — |

Both the shear strength values given in Example 24 and in Example 25 are superior to those of compositions containing polyols in place of polyamine.

EXAMPLE 26

Synthesis of indazole-blocked hexamethylene diisocyanate

The synthesis is carried out substantially as described in Example 3, using 4.0 g of indazole, 2.85 g of hexamethylene diisocyanate, 100 ml of toluene and no DBTL catalyst. Yield: 5.95 g (87% of theory); melting point 152°-154° C.

Elemental analysis: calcd: C: 65.33% H 5.98% N 20.78%; found: C: 65.54% H 5.99% N 20.62%.

IR(KBr):$\nu$(C=O) 1710 cm$^{-1}$.

EXAMPLE 27

5 g (corresponding to 24.72 mmol of blocked NCO groups) of the product of Example 26 mixed with 3.82 g of Jeffamine ® T 430 (corresponding to 24.72 mmol of NH$_2$ groups) and the mixture is milled twice on a three-roll mill. The resultant mixture is storable for more than 1 year at ambient temperature without adverse change. The DSC diagram shows an endothermic peak (maximum at 134° C.) before the exothermic peak corresponding to the cure (maximum at 191° C.). The gel times at 140° C. are 43 minutes, at 160° C. 14 minutes and 10 seconds.

EXAMPLE 28

Synthesis of indazole-blocked methylenediphenyl diisocyanate

The synthesis is carried out substantially as described in Example 1, using 4.0 g of indazole, 4.23 g of Isonate ®M 125 [DOW], 100 ml of toluene and no DBTL catalyst. Yield: 6.9 g (83.9% of theory); melting point: 183°-185° C.

Elemental analysis: calcd: C: 71.59% H 4.56% N 17.27%; found: C: 71.70% H 4.55% N 17.27%.

IR(KBr):$\nu$(C=O) 1720 cm$^{-1}$.

EXAMPLE 29

5 g (corresponding to 20.6 mmol of blocked NCO groups) of the product of Example 28 are mixed with 3.2 g of Jeffamine ®T 403 (corresponding to 20.6 mmol of NH$_2$ groups) and the mixture is milled twice on a three-roll mill. The resultant mixture is storable for more than half a year at ambient temperature without adverse change. The DSC diagram shows an endothermic peak (maximum at 107° C.) before the exothermic peak corresponding to the cure (maximum at 147° C.). The gel times at 120° C. are 19 minutes, at 140° C. 7.7 minutes and at 160° C. 2.2 minutes. After a 1 minute cure at 160° C. the shear strength (measured according to ISO 4587) is 7.1 MPa (Al/Al).

EXAMPLE 30

0.6 g (corresponding to 2 mmol of blocked NCO groups) of hexamethylene diisocyanate blocked with 4-(4-methoxybenzyl)-3,5-dimethylpyrazole (yellow highly viscous oil, elemental analysis: 68.3% C [calcd 67.98%], 7.6% H [calcd 7.38%] and 12.8% N [calcd 13.99%] are mixed with 0.3 g of Jeffamine ®T 403 (corresponding to 2 mmol of NH$_2$ groups) and the mixture is milled twice on a three-roll mill. The resultant mixture is storable for several months at ambient temperature without adverse change. The DSC diagram shows an endothermic peak (maximum at 55° C.) before the exothermic peak corresponding to the cure (maximum at 115° C.). The gel times at 100° C. are 24 minutes and 53 seconds, at 120° C. 5 minutes and 44 seconds, at 140° C. 3 minutes and 14 seconds and at 160° C. 1 minute and 49 seconds.

EXAMPLE 31

0.5 g (corresponding to 1.46 mmol of blocked NCO groups) of methylenediphenyl diisocyanate blocked with 4-(4-methoxybenzyl)-3,5-dimethylpyrazole (colourless solid, elemental analysis: 72.12% C [calcd 67.98%], 6.19% H [calcd 6.2%] and 12.11% N [calcd 12.31%] are mixed with 0.26 g of Jeffamine ®T 403 (corresponding to 1.46 mmol of NH$_2$ groups) and the mixture is milled twice on a three-roll mill. The resultant mixture is storable for several months at ambient temperature without adverse change. The DSC diagram shows an endothermic peak (maximum at 68° C.) before the exothermic peak corresponding to the cure (maximum at 108° C.). The gel times at 100° C. are 2 minutes and 20 seconds, at 120° C. 18 seconds, at 140° C. 6 seconds and at 160° C. c. 1 second.

EXAMPLE 32

2.5 g (corresponding to 12.87 mmol of blocked NCO groups) of hexamethylene diisocyanate blocked with 5-ethyl-3-methylpyrazole (melting point: 76° C., elemental analysis: 60.78% C [calcd 61.83%], 8.29% H [calcd 8.30%] and 21.54% N [calcd 21.63%] are mixed with 2 g of Jeffamine ®T 403 (corresponding to 12.87 mmol of NH$_2$ groups) and the mixture is milled twice on a three-roll mill. The resultant mixture is storable for more than six months at ambient temperature without adverse change. The DSC diagram shows an endothermic peak (maximum at 60° C.) before the exothermic peak corresponding to the cure (maximum at 121° C.). The gel times at 100° C. are 13 minutes, at 120° C. 1 minute and 25 seconds, at 140° C. 40 seconds and at 160° C. 16 seconds.

What is claimed is:

1. A thermosetting composition which comprises at least one blocked polyisocyanate of formula I or II (I)

(II)

wherein n is an integer $\geq 2$,

Q is an organic radical of valency n, and

R$_1$, R$_2$, R$_3$, R$_4$, R$_5$, R$_6$, R$_7$, R$_8$ are each independently of one another hydrogen, alkyl, aryl, arylalkyl, alkoxy, alkylthio or hydroxyl, and a primary or secondary polyamine which is liquid at room temperature and is suitable for crosslinking, which blocked polyisocyanate is essentially insoluble in the polyamine at ambient temperature or moderately elevated temperature.

2. A composition according to claim 1, wherein the polyamine is a polyoxyalkylenepolyamine.

3. A composition according to claim 1, wherein the blocked isocyanate is essentially insoluble in the polyamine at a temperature up to 50° C.

4. A composition according to claim 1, which additionally comprises an agent which lowers the solubility of the blocked isocyanate.

5. A composition according to claim 4, which comprises an agent which enhances the polarity of the medium which surrounds the blocked isocyanate.

6. A composition according to claim 5, wherein the agent is a hydroxyl group containing compound.

7. A composition according to claim 6, wherein the hydroxyl group containing compound is glycerol.

8. A composition according to claim 1, which contains a blocked polyisocyanate in which Q in formula I or II is selected from the organic radicals of formulae III to VII:

(III)

(IV)

(V)

(IV)

(VII)

where the $R_9$ substituents in formula III are each independently of one another hydrogen or alkyl of 1 to 4 carbon atoms.

* * * * *